United States Patent
Juvekar et al.

(10) Patent No.: US 9,380,076 B1
(45) Date of Patent: Jun. 28, 2016

(54) ACCESS MANAGEMENT SYSTEM

(71) Applicant: EMC Corporation, Hopkinton, MA (US)

(72) Inventors: Prashant R. Juvekar, Littleton, MA (US); Cory R. Veilleux, Lakeville, MA (US)

(73) Assignee: EMC Corporation, Hopkinton, MA (US)

( * ) Notice: Subject to any disclaimer, the term of this patent is extended or adjusted under 35 U.S.C. 154(b) by 20 days.

(21) Appl. No.: 14/488,377

(22) Filed: Sep. 17, 2014

(51) Int. Cl.
*H04L 29/06* (2006.01)

(52) U.S. Cl.
CPC .............. *H04L 63/20* (2013.01); *H04L 63/10* (2013.01)

(58) Field of Classification Search
CPC ...................................... H04L 63/20
USPC ............................................. 726/1
See application file for complete search history.

(56) References Cited

U.S. PATENT DOCUMENTS

| | | | | |
|---|---|---|---|---|
| 6,859,832 B1* | 2/2005 | Gecht | .................. | G06F 3/1204 709/219 |
| 7,480,937 B2* | 1/2009 | Imai | .................... | H04L 12/2602 709/223 |
| 2003/0093508 A1* | 5/2003 | Li | ............................ | G06F 8/65 709/222 |
| 2009/0198768 A1* | 8/2009 | Gao | ......................... | G06F 9/54 709/203 |

* cited by examiner

*Primary Examiner* — Longbit Chai
(74) *Attorney, Agent, or Firm* — BainwoodHuang

(57) ABSTRACT

An access management system includes an access management server and one or more fulfillment servers associated with endpoint computers of a production computer system. The fulfillment server includes connectors operative to translate change requests into transactions with the endpoint computer systems to modify access-control records. Fulfillment polling communications are used in which the fulfillment server sends request messages requesting retrieval of active change requests from a database at the access management server, and the access management server sends response messages containing active change requests retrieved from the database. The change requests from the response messages are provided to the connectors to cause the connectors to translate the change requests into corresponding transactions and to perform the transactions with the endpoint computer systems to make modifications to the access-control records of the endpoint computer systems.

20 Claims, 7 Drawing Sheets

ACCESS MANAGEMENT SYSTEM

BACKGROUND

Access management systems are known for managing appropriate access to applications and data resources of a production computer system. In operation, an access management system receives descriptions of access modifications to be made in the production computer system, and then itself interacts with the production computer system to make corresponding modifications to access control records to effect the access modifications. As an example, a new employee in an organization is to be given access for e-mail, a department server, and certain applications related to the employee's job. A system administrator interacts with the access management system to provide relatively high-level description of these access-related additions and modifications for the new employee, and the access management system then interacts with the appropriate computers and applications of the production system, for example by creating an e-mail account on an e-mail server, creating a user account on the department server, and updating access-related records of the applications to indicate that the new employee is permitted to execute the applications. An access management system can improve the efficiency of system management and provide higher-level centralized services to enhance the effectiveness of an access control or governance regime.

SUMMARY

An access management system is disclosed that provides typical benefits of such systems while also providing certain additional efficiency and flexibility.

In one aspect the disclosed access management system utilizes an access management server and one or more separate "fulfillment" servers. This architecture promotes efficiency by a division of labor between the higher-level description and management of change requests and the lower-level methods by which change requests are propagated to specific endpoint computer systems whose access-control records are to be modified.

A computer is operated as a fulfillment server in an access management system managing access-control records at endpoint computer systems, wherein the access-control records describe rights and restrictions of users with respect to resources of the endpoint computer systems and being used by access-control mechanisms of the endpoint computer systems to enforce the rights and restrictions.

The method includes executing computer program instructions to form a set of connectors. The connectors are communicatively coupled to respective endpoint computer systems and are structured and operative to translate change requests provided to the connectors into corresponding transactions with the endpoint computer systems. The transactions use system management protocols native to the respective endpoint computer systems to modify the access-control records of the endpoint computer systems according to contents of the transactions.

The method further includes periodically engaging in fulfillment polling communications with an access management server of the access management system. The access management server maintains a database of active change requests describing modifications to be made to the access-control records. The fulfillment polling communications includes request messages sent from the fulfillment server to the access management server and corresponding response messages sent from the access management server to the fulfillment server, wherein the request messages request retrieval of active change requests from the database and the response messages contain active change requests retrieved from the database.

The method further includes providing the active change requests from the response messages to the connectors to cause the connectors to translate the change requests into corresponding transaction and to perform the corresponding transactions with the endpoint computer systems to make the modifications to the access-control records of the endpoint computer systems.

The polling or request-response characteristic of the above technique resembles more generic request-response protocols widely used for information retrieval in distributed systems including the World Wide Web at large. It may be viewed as a "pull" model, in contrast to a "push" model in which information is sent from a source (e.g., access management server) to a recipient (e.g., fulfillment server) in an unsolicited manner. The polling technique may be more compatible with security needs and features even as systems are deployed in different manners, including for example hybrid deployments in which some servers are located in one or more datacenters (behind an organization firewall) while others are deployed in a hosted or "cloud" manner (outside a firewall). Thus the technique provides for flexibility in the deployment and use of the access management system in a variety of system settings.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
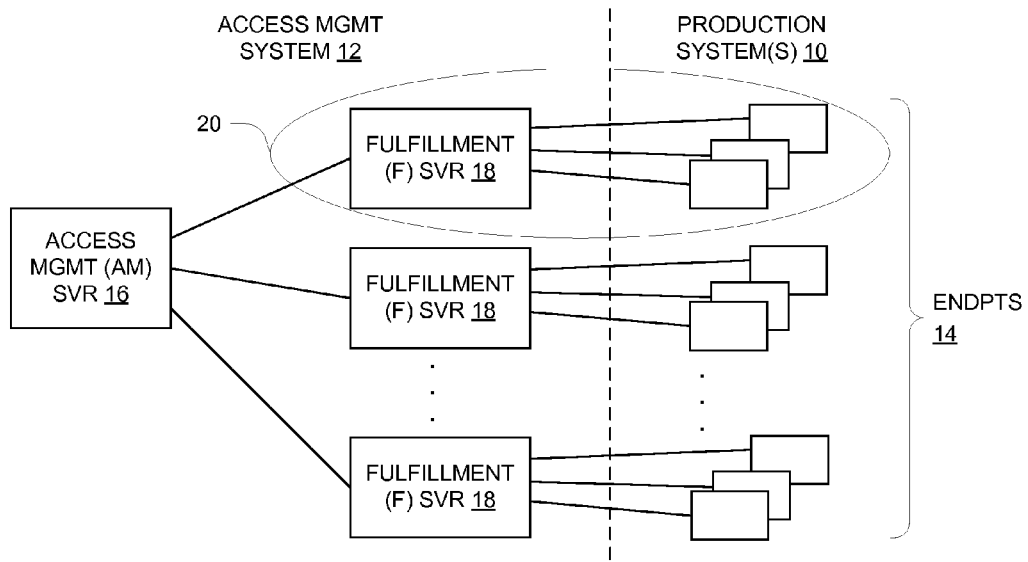
FIG. 1 is a block diagram of a computer system.

FIG. 1 shows a data processing system including one or more production systems 10 and an access management system (ACCESS MGMT SYSTEM) 12. A production system 10 is a set of networked computers and other devices, such as networking equipment and data storage systems, that provides computing services to system users. A production system 10 may reside in one or more datacenters and host one or more applications such as finance/payroll, human resource management, electronic mail, etc. In the illustrated embodiment the production systems 10 are under single administrative control, specifically with respect to access management as described herein. From this perspective the computers and other devices of the production systems 10 are managed entities, referred to herein as "endpoints" (ENDPTS) 14.

The access management system 12 is used to provide centralized management of user access rights in the production systems 10. This management may be based on the mechanism of an "account", which is a defined identity on a particular system and/or within a particular application. In an account-based scheme, users have access to accounts, and accounts hold access privileges (entitlements) for system resources. As shown, the access management system 12 includes an access management server (ACCESS MGMT SVR) 16 having connections to one or more fulfillment servers (FULFILLMENT SVR) 18, each having connections to a respective set of the endpoints 14. As indicated in parentheses, an access management server 16 is also referred to using the acronym "AM" (i.e., as an AM server 16), and a fulfillment server using the acronym "F" (i.e., as an F server 18). Although functionally each fulfillment server 18 is part of the access management system 12, in practice a fulfillment server 18 may be housed remotely from the access management server 16, nearer to or even in the same physical location as its associated endpoints 14. The association of fulfillment server 18 to respective endpoints 14 is indicated at 20.

The access management system 12 provides a view into access control or "governance" data of the endpoints 14, along with ability to create, delete and modify such data for access governance purposes. A common example is creation of a new user account, such as when an organization hires a new employee. In this case it is necessary to create one or more new accounts in a production system 10 and populate the accounts with access control information defining the scope and conditions of the user's access to resources such as applications, databases, etc. In this case a system administrator uses the access management server 16 to create appropriate records at an abstract level. The access management server 16 creates these records, referred to herein as "change requests", and the change requests are provided to one or more of the fulfillment servers 18 associated with the endpoint(s) 14 where access-control records are to be created or modified. A fulfillment server 18 is responsible for translating the abstract change request from the access management server 16 into one or more transactions with an endpoint 14 using an appropriate endpoint-specific protocol. For example, if an affected record is part of a database in an endpoint 14, the fulfillment server 18 may use a database query language to cause the endpoint 14 to update the database accordingly. Other examples are given below.

One key feature of the system is the use of a "pull" model of communications between the fulfillment servers 18 and the access management server 16, i.e., a technique in which each fulfillment server 18 initiates the transfer of change requests from the access management server 16 to the fulfillment server 18. Details are provided below. The pull model is generally compatible with security and other constraints in a variety of system configurations, and thus provides for flexibility in deploying the access management system 12. For example, the access management server 16 may be deployed into a cloud provided by a separate cloud computing provider, while the fulfillment servers 18 reside locally within the firewall of an organization's datacenter. The model also readily supports the use of multiple fulfillment servers 18 with a single access management server 16, including remotely located fulfillment servers 18 outside of a local firewall for the access management server 16.

More generally, the one-to-many arrangement of the access management system 12 can provide a variety of benefits including enhanced performance, availability, and scalability, as well as heterogeneity. For example, one fulfillment server 18 may be operated in a test or development mode while others are operated normally.

Another feature of the disclosed system is the specialization of access management functionality in the access management system 12 as distinct from the production system 10. The production systems include the access-control records being managed and generally provide appropriate external interfaces and protocols, referred to generally as system management protocols, enabling a remote administrative user to create and modify access-control records. There may be a variety of such interfaces and protocols provided across a population of computers in the production system 10. These are generally referred to as being "native" to the endpoints 14, in contrast to a generalized organization and protocol for access-control management used at the access management server 16 as well. The fulfillment servers 18 can be viewed partly as effecting translations between the more generic "change request" regime of the access management server 16 and the more endpoint-specific system management protocols exposed by the endpoints 14 for enabling an external entity to effect changes.

Figure 2:
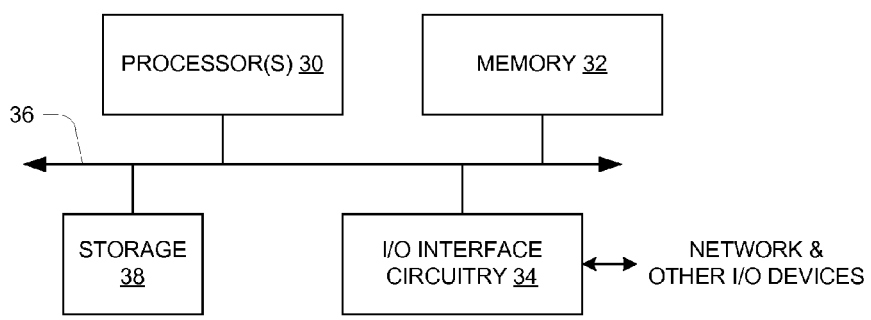
FIG. 2 is a block diagram of a computer from a hardware perspective.

FIG. 2 shows an example configuration of a physical computer such as a server 16, 18 or endpoint 14 from a computer hardware perspective. The hardware includes one or more processors 30, memory 32, and interface circuitry 34 interconnected by data interconnections 36 such as one or more high-speed data buses. The interface circuitry 34 provides a hardware connection to external networks and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 40 to cause the hardware to function in a software-defined manner. Thus the computer hardware executing instructions of an access management application, for example, can be referred to as an access management circuit or an access management component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
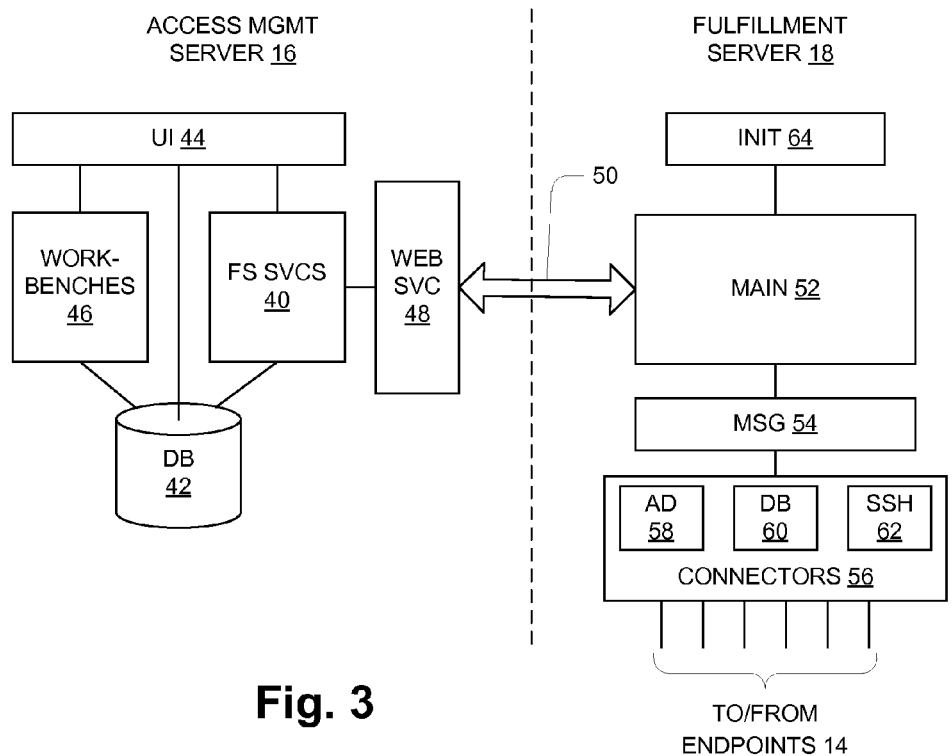
FIG. 3 is a block diagram of an access management server and a fulfillment server.

FIG. 3 shows the access management server 16 as well as a fulfillment server 18. The functional core of the access management server 16 includes a fulfillment server services (FS SVCS) component 40 and a database 42. A user interface (UI) 44 is provided to system management users, such as system administrators. A set of "workbenches" 46 are specialized tools for certain tasks, as described below. A web service (WEB SVC) 48 provides access to the FS services 40 and database 42 from the fulfillment server 18 via a communications interface 50, which is described more below. The functional core of the fulfillment server 18 includes a main component (MAIN) 52, an internal messaging service (MSG) 54, and a set of specialized components referred to as "connectors" 56. In the illustrated example the connectors 56 include an active directory (AD) connector 58, a database (DB) connector 60, and a secure shell (SSH) connector 62. The fulfillment server 18 also includes an initialization component (INIT) 64.

Figure 4:
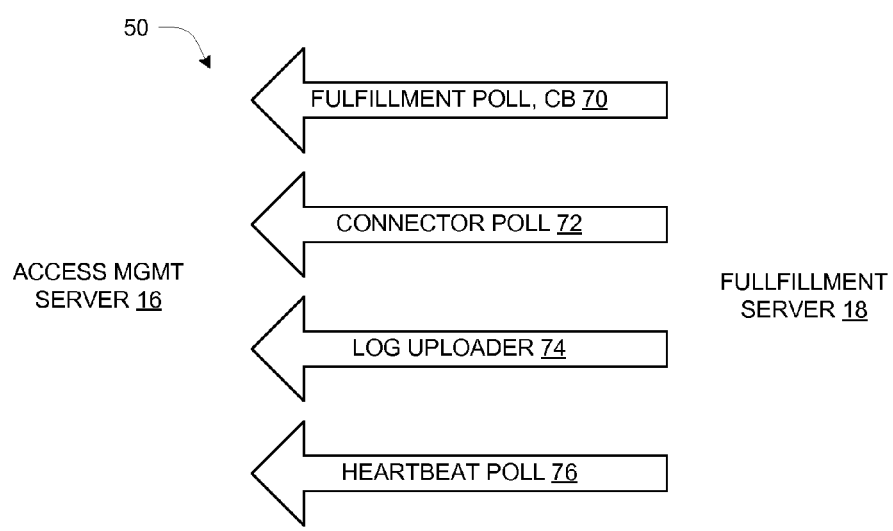
FIG. 4 is a schematic diagram of a set of sub-channels of a communications channel.

FIG. 4 is a schematic view of the communications interface 50. As shown, it employs several components including a fulfillment poll 70 which includes a callback (CB) function, a connector poll 72, a log uploader 74 and a heartbeat poll 76. Each of the polls 70, 72 includes corresponding request messages initiated by the fulfillment server 18 and corresponding response messages sent by the access management server 18. The fulfillment poll 70 is used to deliver change requests from the access management server 16 to the fulfillment server 18. The connector poll 72 is used to deliver new or modified connectors 56 from the access management server 16 to the fulfillment server 18. The log uploader 74 is used to deliver logs from the fulfillment server 18 to the access management server 16 for storing in the database 42. Detailed operations of the polls 70, 72 and the log uploader 74 are given below with reference to FIGS. 5 and 7-8.

The heartbeat poll 76 is used by the fulfillment server 18 to inform the access management server 16 that the fulfillment server 18 is up and running, and to provide the status of each connector 56 (running, deployed, not deployed, migration required, etc.). If the access management server 16 does not hear from the fulfillment server within a poll time window, then it will mark the fulfillment server 16 as offline.

A brief description of operation is provided with reference to FIGS. 3 and 4. More detailed aspects of operation are provided further below.

In general there will be a higher-level administrative workflow in operation that identifies a need for changes, coordinates the identification of change requests and any necessary approvals for specific changes to be made, and interacts with the access management system 12 to cause the changes to actually be made. There may also be other processes such as verification, auditing, troubleshooting, etc. Such administrative processing may be supported in part by the access management system 12, but it is generally outside the scope of the present disclosure which is directed to the delivery of authorized change requests to the fulfillment servers 18 and the translation of those change requests into endpoint-specific communications by which requested changes are actually made.

From the perspective of the access management system 12, change requests are initiated by a system user via the UI 44 of the access management server 16, and corresponding change request records are stored in the database 42. It should be noted that the term "change request" herein refers to both the abstraction provided by the UI 44 (i.e., the content, logic and presentation of the UI 44 identified as a "change request"), as well as to the concrete records created in the database 42 for changes to be made on the endpoints 14.

The main component 52 of the fulfillment server 18 operates the fulfillment poll 70 (FIG. 4) to request new change requests from the access management server 16. These fulfillment poll requests are received by the web service 48 and forwarded to the FS services component 40, which in turn accesses the database 42 to retrieve stored change requests that have not yet been sent to the fulfillment server 18. Retrieved change request(s) are returned by the web service 48 to the fulfillment server 18 in response messages of the fulfillment poll 70. The change requests may be marked in the database 42 as open or pending, meaning they have been delivered to a fulfillment server 18 but have not yet been completed.

At the fulfillment server 18, the main component 52 uses the messaging service 54 to queue the change requests to appropriate connectors 56, and each connector 56 translates a change request it receives into one or more corresponding transactions with an associated endpoint 14 to effect the requested change. When the transaction(s) for a given change request have successfully completed, the fulfillment server 18 sends a callback to the access management server 16 to signal completion of the change request, whereupon the change request may be removed from the database 42 or marked as being completed. The access management server 16 may employ a timer or other mechanism for tracking outstanding change requests (i.e., change requests sent to the fulfillment server 18 for which no callback has yet been received) so as to initiate corrective action when indicated. Completed change requests may be stored for some period for auditing/reporting purposes.

Figure 5:
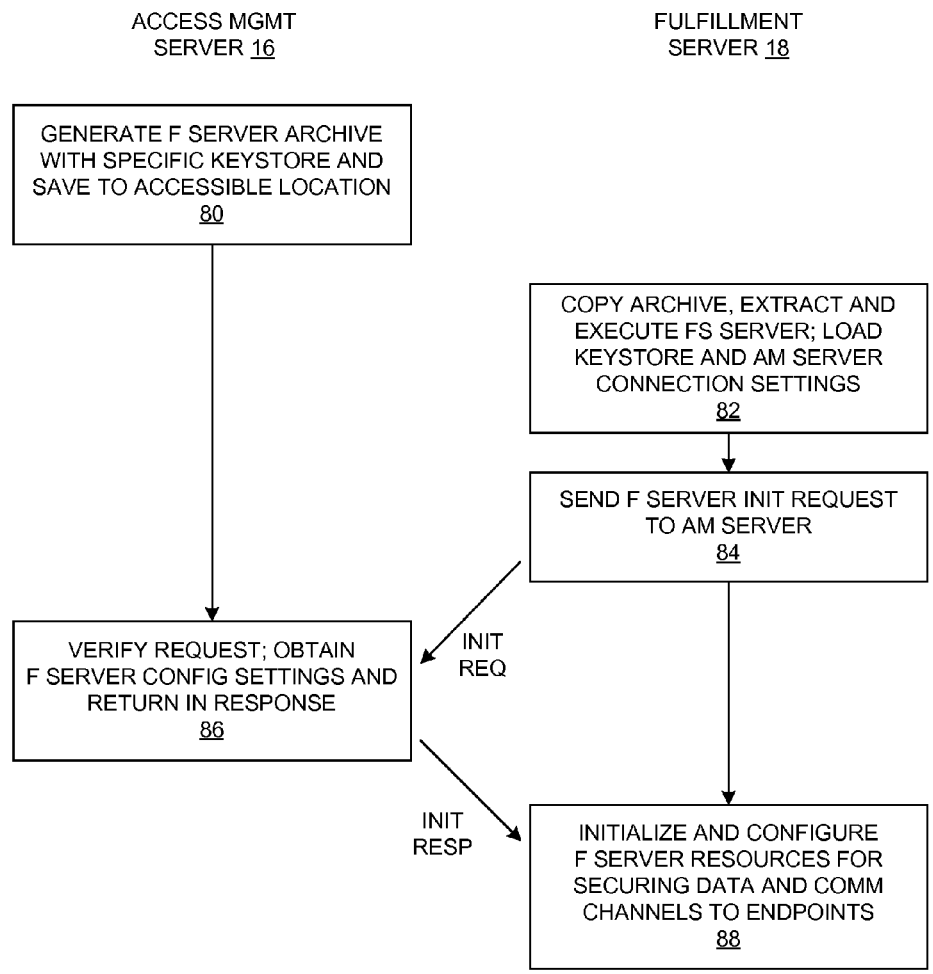
FIG. 5 is a flow diagram of deployment of a fulfillment server.

FIG. 5 illustrates a process by which a new fulfillment server 18 is deployed and initialized. It will be appreciated that a fulfillment server 18 is a physical computer executing a set of instructions of a fulfillment server application. In the following description the term "server" may be used as a shorthand reference to the application or software image itself. This is only for convenience and does not indicate that the present application is in any way directed to software per se.

Beginning at 80, the access management server 16 generates a new fulfillment server archive and stores it in a location accessible to a physical computer that is to execute the new fulfillment server. More specifically, a "download server archive" operation is invoked by a system user from the UI 44 (FIG. 3), and the UI 44 calls the FS services 40 (FIG. 3) to generate the downloadable archive. The FS services 40 generates an archive and returns a handle to the generated archive. The archive includes a server-specific keystore file storing security keys that will be used by the new fulfillment server for security purposes as described more below. The fulfillment server archive is saved to a user-specified location, which may be on the access management server 16 or on another network-accessible machine.

At 82, the saved archive is copied and extracted on a fulfillment server physical machine and the new fulfillment server 18 is started. When the fulfillment server 18 starts, the INIT component 64 (FIG. 3) loads the keystore file and AM server connection settings (e.g., host, port) obtained from the archive.

At 84, the INIT component 64 sends a "server initialization" request (INIT REQ) to the access management server 16, having first established a secure communication channel (e.g., HTTPS/SSL) for these and other communications.

At 86, the access management server 16 first inspects the initialization request and authorizes it for subsequent processing. This may be done by a specialized authorization filter component (not shown) of the web service 48 (FIG. 3). This filter component verifies the request (F server identity, certificate chain, request type, etc.). In general for high security, it is desirable that all request/response communications between the AM server 16 and F server 18 occur over a secure channel (i.e., HTTPS/SSL), and that all requests are inspected/authorized by this filter before any more substantive processing occurs.

Once the request is authorized and verified, it is processed in order to obtain configuration settings and return them to the requesting fulfillment server 18. The web service 48 calls the FS services 40 to obtain the configuration settings. This may be done by another specialized sub-component of the web service 48 referred to as a "request dispatcher" (not shown). The FS services 40 obtains the configuration settings for the specified F server 18 from the database 42 and returns these to the web service 48, which then returns these via an initialization response (INIT RESP) message to the fulfillment server 18.

At 88, the fulfillment server 18 uses the information from the initialization response, the local keystore, and a separate local truststore (such as a Java runtime environment (JRE) truststore, not shown) to initialize/configure server resources for securing data within the fulfillment server 18 as well as the communication channels to target endpoints 14 (e.g., SSL Context, Encryption Mgr). At this point, the new fulfillment server 18 is ready for operation.

Figure 6:
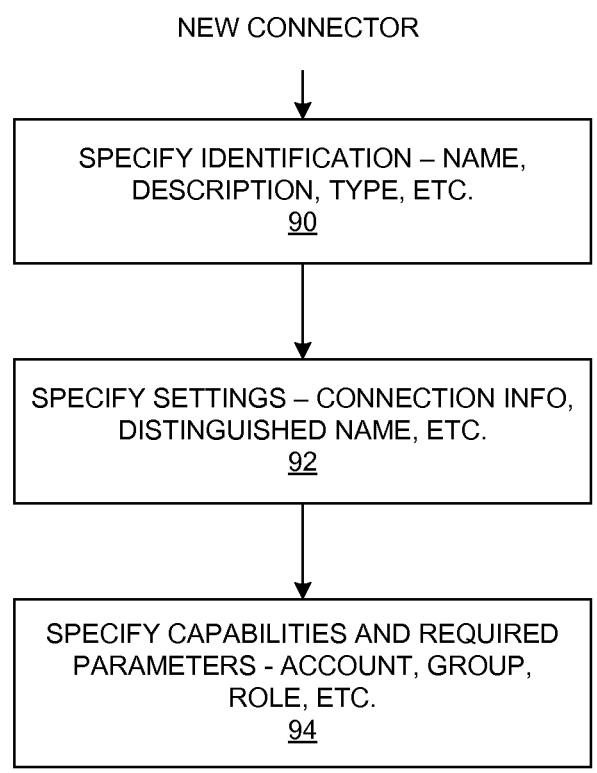
FIG. 6 is a flow diagram of creation of a connector.

FIG. 6 illustrates a process for creating a new connector 56 for a specific endpoint 14. This process can be seen as configuring a fulfillment server 18 with additional capabilities beyond the runtime capabilities described above. It is necessary to configure endpoint data to be used at runtime. In particular, it is necessary to define endpoint instances by specifying the type of adapter/connector to use when talking to them; how to connect to them; which of the common commands the endpoint will support; and for each supported command what information the endpoint will require as part of the command and how to implement the command. The configuration process is performed using a GUI-based workbench tool of the workbenches 46 (FIG. 3).

At 90, identification information is specified for the connector, such as a name, a description, and a type. The name and description may be free form text, and the type may be selected from among a set of types already created/established in the system. Example types include Active Directory or LDAP, Database (generic or specific), Secure Shell, etc. Templates for the types will have previously been created by a separate process.

At 92, settings for the new connector are specified. Classes of settings include connection settings (for the connection to the endpoint 14) and distinguished name settings (for the account or group at the endpoint 14). Connection settings can include things like host name/identifier/port number, and login information.

At 94, capabilities and required parameters for using this connector are specified, and this is done on an account/group/role basis. A capability is the support for a particular command or operation. With respect to accounts, for example, possible capabilities include Create/Delete, Add to/Remove from Group, Enable/Disable, Add/Remove Role, Add/Remove Entitlement. Similar capabilities can be specified for groups and roles. This specification may be performed by providing a user with a list of capabilities with associated check boxes, and then receiving user selection via the check boxes. Additionally, for each capability it is necessary to specify a set of required parameters that must be supplied in a change request to exercise the capability. For example, to implement an "AddEntitlementToAccount" command on a database type connector, it might be required that at minimum an account name and identification of an entitlement be supplied. It may be desirable to also specify optional parameters, supporting flexibility and efficiency through use of default values, for example.

Another part of specifying capabilities is to define endpoint-type specific implementation details to actually make the command happen on the endpoint. Some endpoints may not require this configuration. For a database-type endpoint, an SQL statement or series of SQL statements, referring to the required parameters, might be specified. For a Unix system, a shell script that is to be executed might be specified, using the required parameters as variables, etc.

Once an endpoint definition has been created and its details filled in per the above, the result can be viewed as an "endpoint contract"—the specification of an endpoint name and a list of commands that a fulfillment server 18 advertises for use in automatic fulfillment, if the incoming command requests include correct values for all required parameters.

It is the job of the AM server 16 to understand how to turn the abstract or business-level change requests (per its UI 44) into a series of atomic/individual change items, and then to use the endpoint contracts to turn the change items into a set of change requests (records in the database 42) with all required parameters filled in (as well as optional parameters as appropriate). It is the job of a fulfillment server 18 to retrieve the change requests using the fulfillment poll 70 and fulfill them by connecting to the endpoint systems 14 and using the endpoint-specific commands (e.g., SQL, SSH, etc.) along with the parameter information in the change requests to make the changes on the endpoint systems 14.

Figure 7:
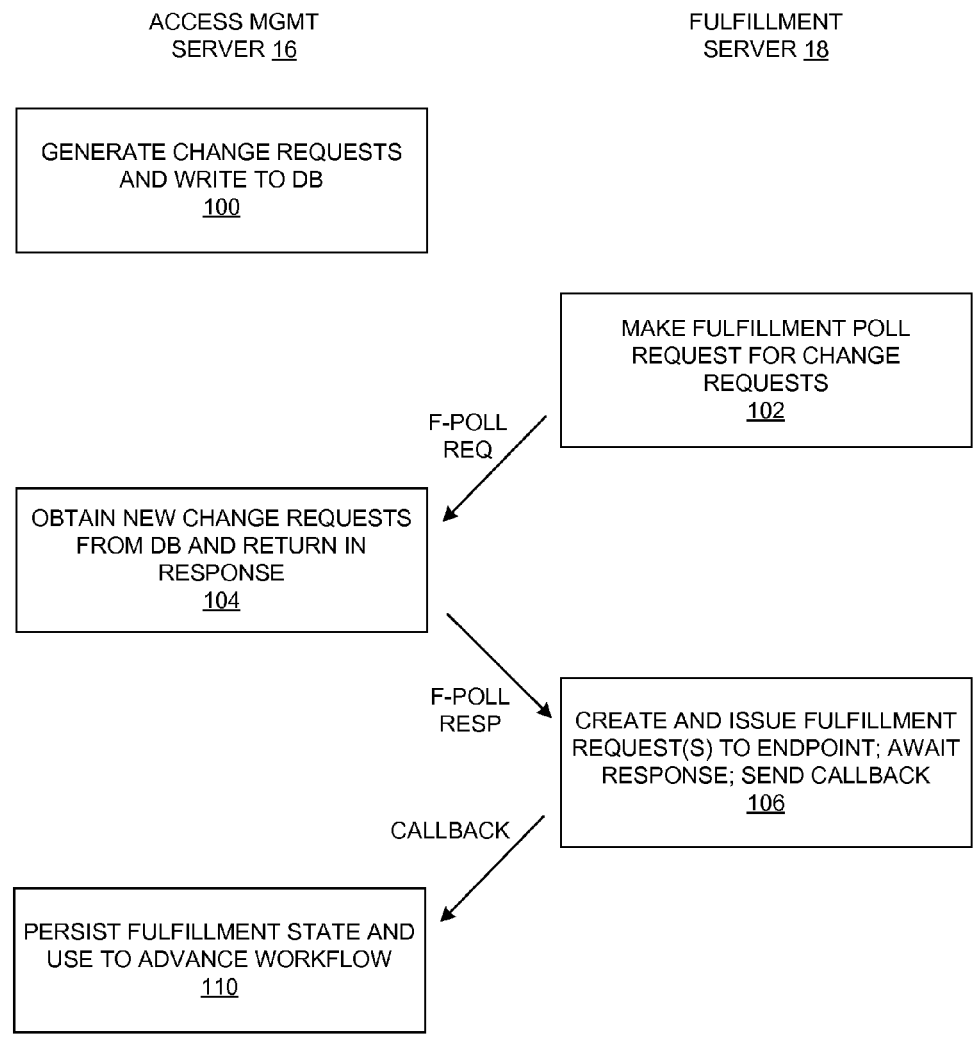
FIG. 7 is a flow diagram of a fulfillment poll.

FIG. 7 illustrates operation of the fulfillment poll 70, which is also referred to as "F-poll" herein. At 100 (performed at AM server 16), change requests are generated and written to the database 42. As mentioned above, these are generally created as part of a higher-level administrative workflow, including actions of a human administrative user via the UI 44. The workflow issues the change request(s) and item(s) to the FS services 40 (FIG. 3) which writes to the database 42. Activities at 100 are largely independent of other operations, including many of the subsequent operations by which the change requests are actually fulfilled. There can be signaling of completion and/or of an error (non-completion) as described below. Also, in a given embodiment there may be a limit on the number of changes in progress at a given time.

At 102, the fulfillment server 18 (specifically the main component 52) issues a polling request (F-POLL REQ) to the access management server 16 (specifically to the web service 48) for new change requests. At 104 the access management server 16 obtains any new change requests in the database 42 and returns them in a response (F-POLL RESP) to the fulfillment server 18. In the illustrated embodiment, this may occur by the web service 48 first querying the FS services 40 for new change requests in the database 42, the FS services accessing the database 42 and responding with the new change requests that is has obtained, and the web service 48 then preparing and sending the poll response with the change requests to the fulfillment server 18. Note that for a given poll request there may be no new change requests, and the response will so indicate. Also, a particular "poll-and-block" technique described below may be used to improve efficiency.

At 106, the fulfillment server 18 processes the change requests to create and issue corresponding commands/requests to the endpoints 14 (referred to as "fulfillment requests") using the appropriate connectors 56. It awaits responses and then issues callbacks to the access management server 16 indicating completion of the change requests. In the usual case everything is completed successfully and this is indicated in the callbacks. If for some reason a fulfillment request fails, the callback will indicate such failure for the associated change request.

The processing at 106 may be performed at the fulfillment server 18 more specifically as follows:

1. Main component 52 enqueues the request(s) in message queues of the messaging service 54 for the corresponding connectors 56.
2. A connector 56 reads a request from its message queue.
3. The connector issues the fulfillment request to its endpoint 14.
4. Completion is ascertained. For example, the endpoint 14 may explicitly respond with a success/failure indication.
5. The connector queues a callback to a callback queue
6. The main component 52 reads the callback queue and sends the callback to the web service 48.

At 110, the access management server 16 "persists" the fulfillment state from the callback, i.e., stores the reported completion information (e.g., success/failure) in the database 42 in association with the change request. This persisted state is then usable to advance the higher-level workflow. For example, there may be a screen in the UI 44 for tracking the status of change requests, and the UI 44 may update this information periodically based on the persisted state from the database 42. If an error has occurred, that information might be used to alert a system administrator that a change request was not completed, so that separate corrective action may be taken.

As mentioned, a particular type of polling protocol may be employed for purposes of efficiency. This technique is described as follows:

1. The F server 18 requests change requests from the AM server 16. If the AM server 16 has new change requests, it will immediately reply with at least one change request.

2. The F server 18 processes the change requests, and immediately issues another request for change requests. If the AM server 16 has no new change requests, it will suspend or "block" up to some predetermined amount of time (e.g., 15 seconds) to wait for new change requests to be added to the database 42.

3. If a new change request arrives during the wait, the AM server 16 immediately replies with at least one change request.

4. If a change request does not arrive during the wait, the AM server 16 replies to the F server 18 with a "no changes" message.

If the fulfillment server 18 is unable to reach the access management server 16, it will wait some predetermined amount of time (e.g., 30 seconds) and retry the request. This is to avoid a tight loop of error messages.

The above technique enhances data liveliness. In a regular polling loop, changes that show up immediately after one polling response would not be sent on until the next poll, which occurs at user-defined intervals. The above technique provides a chance for such new changes to be sent on immediately.

Figure 8:
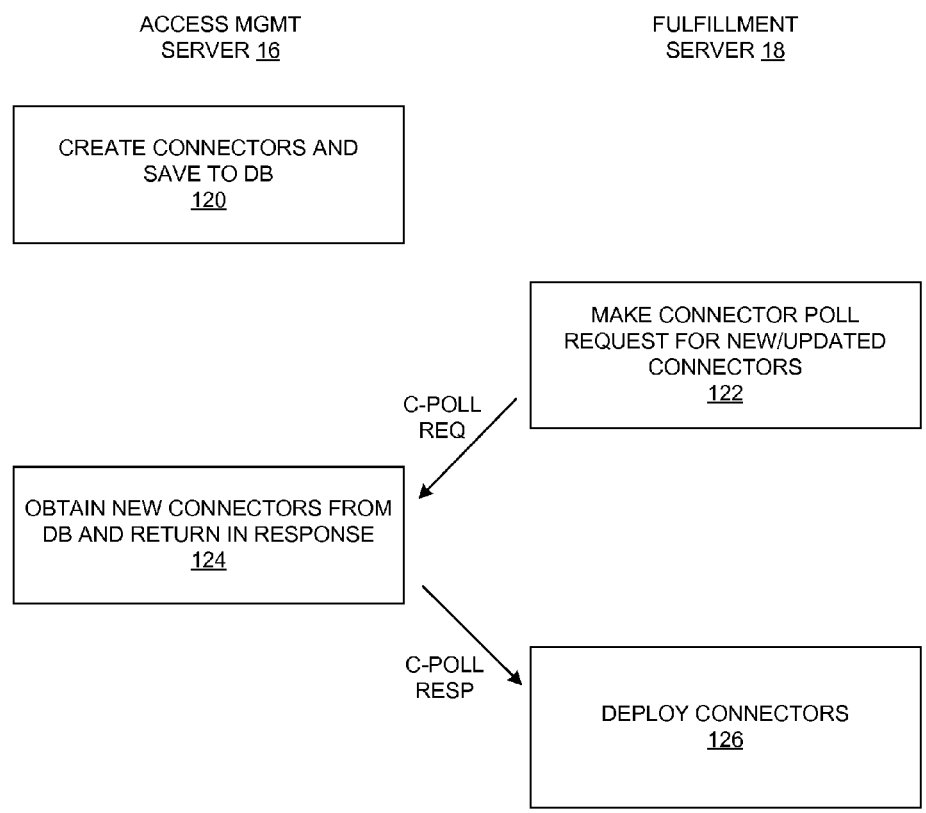
FIG. 8 is a flow diagram of a connector poll.

FIG. 8 illustrates operation of the connector poll 72, which is also referred to as "C-poll" herein.

At 120, connectors are created and saved in the database 42 at the access management server 16. This process is described above. The UI 44 may support the creation and use of templates for greater efficiency.

At 122, the Main component 52 of the fulfillment server 18 issues connector polling requests (C-POLL REQ) to the web service 48 for any new or updated connectors. At 124, the access management server 16 obtains such new/updated connectors from the database 42 and returns them in a response (C-POLL RESP) to the fulfillment server 18. This process can involve the web service 48 interacting with FS services 40 similar to as described above for the F-poll 70.

At 126, the Main component 52 of the fulfillment server 18 deploys the new/updated connectors, i.e., makes them available for use in handling fulfillment requests.

Figure 9:
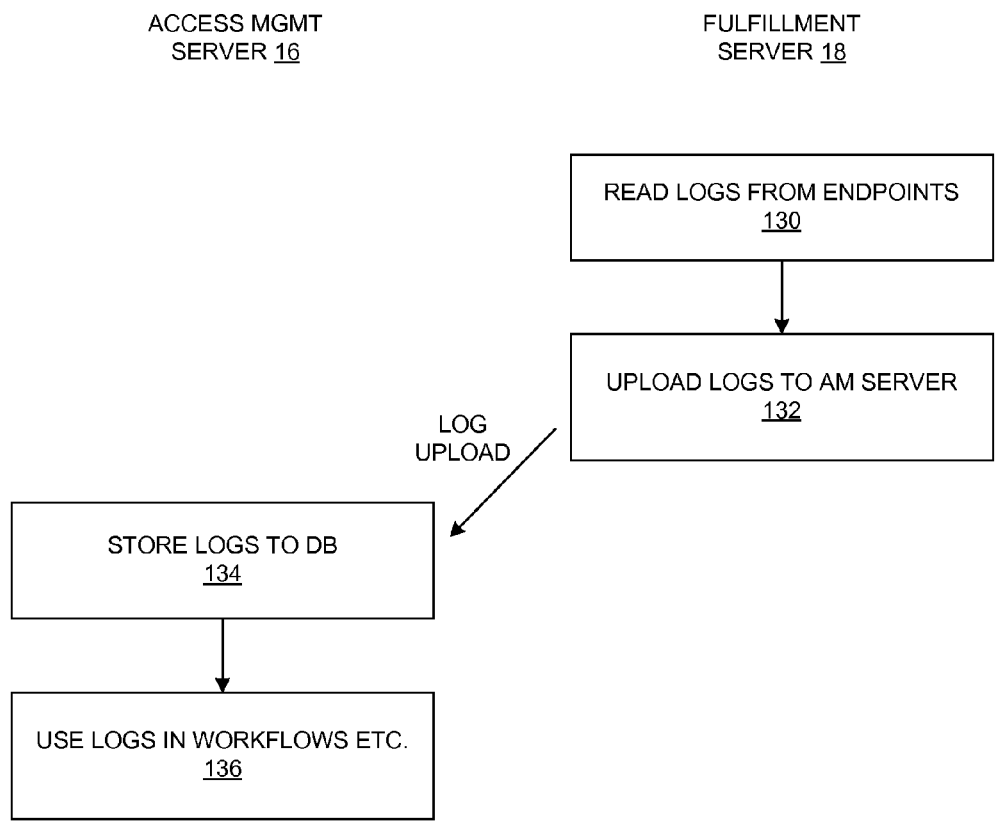
FIG. 9 is a flow diagram of a log uploader.

FIG. 9 illustrates operation of the log uploader 74. At 130, the fulfillment server 18 reads (or otherwise obtains) logs from the endpoints 14. At 132, the logs are uploaded to the access management server 16 using the log uploader mechanism 74. At 134, the access management server 16 stores uploaded logs in the database 42, and at 136 the stored logs are used as needed, e.g., in workflows for data collection, error diagnosis, etc.

As generally known in the art, logs are messages or collections of messages conveying information about events occurring or conditions encountered during operation. In the illustrated system, there may be logs at multiple levels, e.g., at the level of a fulfillment server 18, at the level of an individual connector 56, and at the level of an individual change request (tracking events occurring in the context of processing that change request). At the server level, logs may be generated when information sources or loaded or initialized, for example. At the connector level, logs may be generated when a connector is loaded or unloaded (disabled), for example. At the change request level, logs may be generated when a command is dispatched from the fulfillment server 18 to an endpoint 14, for example.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer as a fulfillment server in an access management system managing access-control records at endpoint computer systems, the access-control records describing rights and restrictions of users with respect to resources of the endpoint computer systems and being used by access-control mechanisms of the endpoint computer systems to enforce the rights and restrictions, the method comprising:

executing computer program instructions, by a processor, to form a set of connectors, the connectors being communicatively coupled to respective endpoint computer systems and being structured and operative to translate change requests provided to the connectors into corresponding transactions with the endpoint computer systems, the transactions using system management protocols native to the respective endpoint computer systems to modify the access-control records of the endpoint computer systems according to contents of the transactions;

periodically engaging, by the processor, in fulfillment polling communications with an access management server of the access management system, the access management server maintaining a database of active change requests describing modifications to be made to the access-control records, the fulfillment polling communications including request messages sent from the fulfillment server to the access management server and corresponding response messages sent from the access management server to the fulfillment server, the request messages requesting retrieval of active change requests from the database and the response messages containing active change requests retrieved from the database; and providing, by the processor, the active change requests from the response messages to the connectors to cause the connectors to translate the change requests into corresponding transaction and to perform the corresponding transactions with the endpoint computer systems to make the modifications to the access-control records of the endpoint computer systems, the method further comprising:

periodically engaging, by the processor, in connector polling communications with the access management server, the access management server storing new connectors in the database to be sent to the fulfillment server for use thereby, the connector polling communications including request messages sent from the fulfillment server to the access management server and corresponding response messages sent from the access management server to the fulfillment server, the request messages requesting retrieval of new connectors from the database and the response messages containing new connectors retrieved from the database; and deploying, by the processor, the connectors received in the response messages for fulfilling change requests directed to associated ones of the endpoint computer systems, wherein creating a new connector includes configuring endpoint data to be used at runtime, in particular defining endpoint instances by specifying (i) a type of connector to use when talking to the endpoint instances; (ii) how to connect to the endpoint instances; (iii) which of a set of common commands an endpoint instance will support; and (iv) for each supported command, what information the endpoint instance will require as part of the command and how to implement the command, and wherein creating a new connector includes specifying capabilities and required parameters for using the connector, a capability being support for a particular command or operation with respect to one or more of a group, account, or role, and further including, for each capability, receiving a set of required parameters that must be supplied in a change request to exercise the capability.

2. A method according to claim 1, wherein the change requests include requests to add access, remove access, and modify access by a user to the resources of the endpoint computer systems.

3. A method according to claim 1, wherein the fulfillment server is deployed inside a firewall of an organization and the access management server is deployed in a compute cloud outside the firewall of the organization, and wherein the fulfillment polling communications employ a standard client-server request/response protocol over a secure transport session.

4. A method according to claim 1, wherein the fulfillment server is a first one of a plurality of fulfillment servers coupled to the access management server and employing respective fulfillment polling communications to obtain respective change requests from the database.

5. A method according to claim 4, wherein the access management server is deployed within a firewall of an organization, and wherein a first set of the fulfillment servers are also located within the firewall and a second set of the fulfillment servers are located outside the firewall.

6. A method according to claim 1, wherein the response messages are first response messages each including at least one active change request, and the fulfillment polling communications also includes second response messages indicating that no active change requests are being returned, and further including the fulfillment server (i) immediately sending a second request message for additional active change requests upon receiving one of the first response messages and (ii) refraining from immediately sending a second request message for additional active change requests upon receiving one of the second response messages.

7. A method according to claim 1, wherein the fulfillment server includes a fulfillment server application executed by the computer, and further including instantiating and initializing the fulfillment server prior to performing the method of claim 1.

8. A method according to claim 7, wherein instantiating the fulfillment server includes (i) requesting download of a server archive from the access management computer, and (ii) downloading the server archive from a location specified by the access management computer.

9. A method according to claim 1, further comprising:

gathering logs from the endpoint computer systems, the logs containing records of activity of the endpoint computer systems pertaining to the access-control records; and periodically uploading gathered logs to the access management system for storage in the database in support of workflows retrieving and using the logs from the database.

10. A method of operating a computer as an access management server in an access management system managing access-control records at endpoint computer systems, the access-control records describing rights and restrictions of users with respect to resources of the endpoint computer systems and being used by access-control mechanisms of the endpoint computer systems to enforce the rights and restrictions, the method comprising:

receiving, by a processor, user specifications of modifications to be made to the access-control records;

creating, by the processor, corresponding change request records and storing them in a database; and engaging, by the processor, in fulfillment polling communications with a fulfillment server responsible for causing the changes described by the change requests to be made on the endpoint computer systems, the fulfillment polling communications including (i) receiving request messages from the fulfillment server requesting retrieval of active change requests from the database, and (ii) sending corresponding response messages to the fulfillment server containing active change requests retrieved from the database, the method further comprising:

creating, by the processor under control of a user, new connectors for use with corresponding endpoint computer systems and storing the new connectors in the database to be sent to the fulfillment server for use in fulfilling change requests directed to associated ones of the endpoint computer systems; and periodically engaging, by the processor, in connector polling communications with the fulfillment server, the connector polling communications including request messages sent from the fulfillment server to the access management server and corresponding response messages sent from the access management server to the fulfillment server, the request messages requesting retrieval of new connectors from the database and the response messages containing new connectors retrieved from the database, wherein creating a new connector includes configuring endpoint data to be used at runtime, in particular defining endpoint instances by specifying (i) a type of connector to use when talking to the endpoint instances; (ii) how to connect to the endpoint instances; (iii) which of a set of common commands an endpoint instance will support; and (iv) for each supported command, what information the endpoint instance will require as part of the command and how to implement the command, and wherein creating a new connector includes specifying capabilities and required parameters for using the connector, a capability being support for a particular command or operation with respect to one or more of a group, account, or role, and further including, for each capability, specifying a set of required parameters that must be supplied in a change request to exercise the capability.

11. A method according to claim 10, further including monitoring for completion by the fulfillment server of active change requests stored in the database, the monitoring including receiving callback messages from the fulfillment server and using completion status information from the callback messages to update completion status information for the active change requests stored in the database.

12. A method according to claim 10, wherein the response messages are first response messages each including at least one active change request, and the fulfillment polling communications also includes second response messages indicating that no active change requests are being returned, and further including, by the access management server upon receiving a request message when no active change requests are in the database, (i) waiting a predetermined period for a new change request to be added to the database, (ii) upon addition of one or more new change requests to the database, sending a first response message to the fulfillment server containing at least one of the new change requests, and (iii) upon the predetermined period ending without a new change request being added to the database, sending a second response message to the fulfillment server.

13. A method according to claim 10, further including, in response to a request for deployment of a new fulfillment server, (i) generating a new fulfillment server archive containing an instance of a fulfillment server application program and (ii) storing the new fulfillment server archive in a location accessible to a physical computer that is to execute the fulfillment server application program to form the new fulfillment server.

14. A method according to claim 10, further comprising:
periodically receiving uploaded logs from the fulfillment server, the logs containing records of activity at the endpoint computer systems pertaining to the access-control records; and
storing the received logs in the database in support of workflows retrieving and using the logs from the database.

15. A method according to claim 10, wherein configuring the endpoint data is performed using a GUI-based workbench tool of workbenches included in the access management server.

16. A method according to claim 10, wherein creating a new connector includes specifying identification information for the connector, the identification information including a name, a description, and a type, the type being selected from among a set of predetermined types previously created or established.

17. A method according to claim 10, wherein creating a new connector includes specifying settings for the new connector, the settings being of multiple classes including (i) connection settings for a connection to an endpoint, and ii) distinguished name settings for an account or group at the endpoint.

18. A method according to claim 1, wherein configuring the endpoint data is performed using a GUI-based workbench tool of workbenches included in the access management server.

19. A method according to claim 1, wherein creating a new connector includes receiving identification information for the connector, the identification information including a name, a description, and a type, the type being selected from among a set of predetermined types previously created or established.

20. A method according to claim 1, wherein creating a new connector includes receiving settings for the new connector, the settings being of multiple classes including (i) connection settings for a connection to an endpoint, and ii) distinguished name settings for an account or group at the endpoint.

* * * * *